(12) United States Patent
Sheedy et al.

(10) Patent No.: US 9,241,176 B2
(45) Date of Patent: Jan. 19, 2016

(54) CONTENT VALIDATION TECHNIQUES

(75) Inventors: Sean M. Sheedy, Lake Oswego, OR (US); Carl H. Seaton, Forest Grove, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1122 days.

(21) Appl. No.: 12/690,713

(22) Filed: Jan. 20, 2010

(65) Prior Publication Data

US 2010/0185751 A1 Jul. 22, 2010

Related U.S. Application Data

(60) Provisional application No. 61/145,892, filed on Jan. 20, 2009.

(51) Int. Cl.

| G06F 15/16 | (2006.01) |
|---|---|
| H04N 7/173 | (2011.01) |
| G06F 12/00 | (2006.01) |
| H04N 21/236 | (2011.01) |
| H04N 21/218 | (2011.01) |
| H04N 21/262 | (2011.01) |
| H04N 21/8352 | (2011.01) |

(52) U.S. Cl.
CPC ..... *H04N 21/23617* (2013.01); *H04N 21/2182* (2013.01); *H04N 21/26266* (2013.01); *H04N 21/8352* (2013.01)

(58) Field of Classification Search
CPC .......... H04N 21/2182; H04N 21/8352; H04N 21/26266; H04N 21/23617
USPC ........................................ 709/219
See application file for complete search history.

(56) References Cited

U.S. PATENT DOCUMENTS

| 2009/0103898 A1* | 4/2009 | Morioka et al. ............... 386/117 |
| 2012/0209966 A1* | 8/2012 | Rose ............................. 709/219 |

OTHER PUBLICATIONS

Dutta et al. Smart Video Streams:101 Uses of the User Data Field in MPEG, pp. 1462-1466, 1996.*

* cited by examiner

*Primary Examiner* — Larry Donaghue
(74) *Attorney, Agent, or Firm* — Troy A. Van Aacken

(57) ABSTRACT

A video server inserts unique content identifiers into private packets of a digital program stream file as a result of loading the file onto a video server.

21 Claims, 5 Drawing Sheets

CONTENT VALIDATION TECHNIQUES

PRIORITY CLAIM

This application claims priority under 35 U.S.C. 119 to U.S. application No. 61/145,892 filed on Jan. 20, 2009.

TECHNICAL FIELD

The present disclosure relates to content validation within a video streaming network.

BACKGROUND

Certain conditions in content distribution networks may cause subscribers to view content that was erroneously sent to them. This may include fully-viewable assets as well as partial frames inserted into the wrong session. Some conditions which may result in this problem are: (1) incorrect data written to a disk; (2) disks that fail to write data; (3) data read from an incorrect location; (4) erroneously streaming two programs to the same location; and (5) erroneously streaming a program to the wrong locations.

The problem may be mitigated by the use of a "content crawler", which detects corruption and quarantines bad content from being accessed. Content may be checksummed when loaded on the video server. A server process continuously runs checksums across all content and compares to the original checksums. If the two checksums don't match, the content is quarantined (marked unreadable). It may take many hours to check all content on a system. Corruption may not be found for that period of time. That leaves a hole in the protection, a window after disk or volume corruption, and vectors unrelated to disk or volume corruption. Such vectors may include: (1) requesting the wrong content; (2) files being named incorrectly; (3) two streams sent to the same address; (4) a stream sent to the wrong set top box; and (5) packet corruption during network transmission and QAM (Quadrature Amplitude Modulation) processing.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
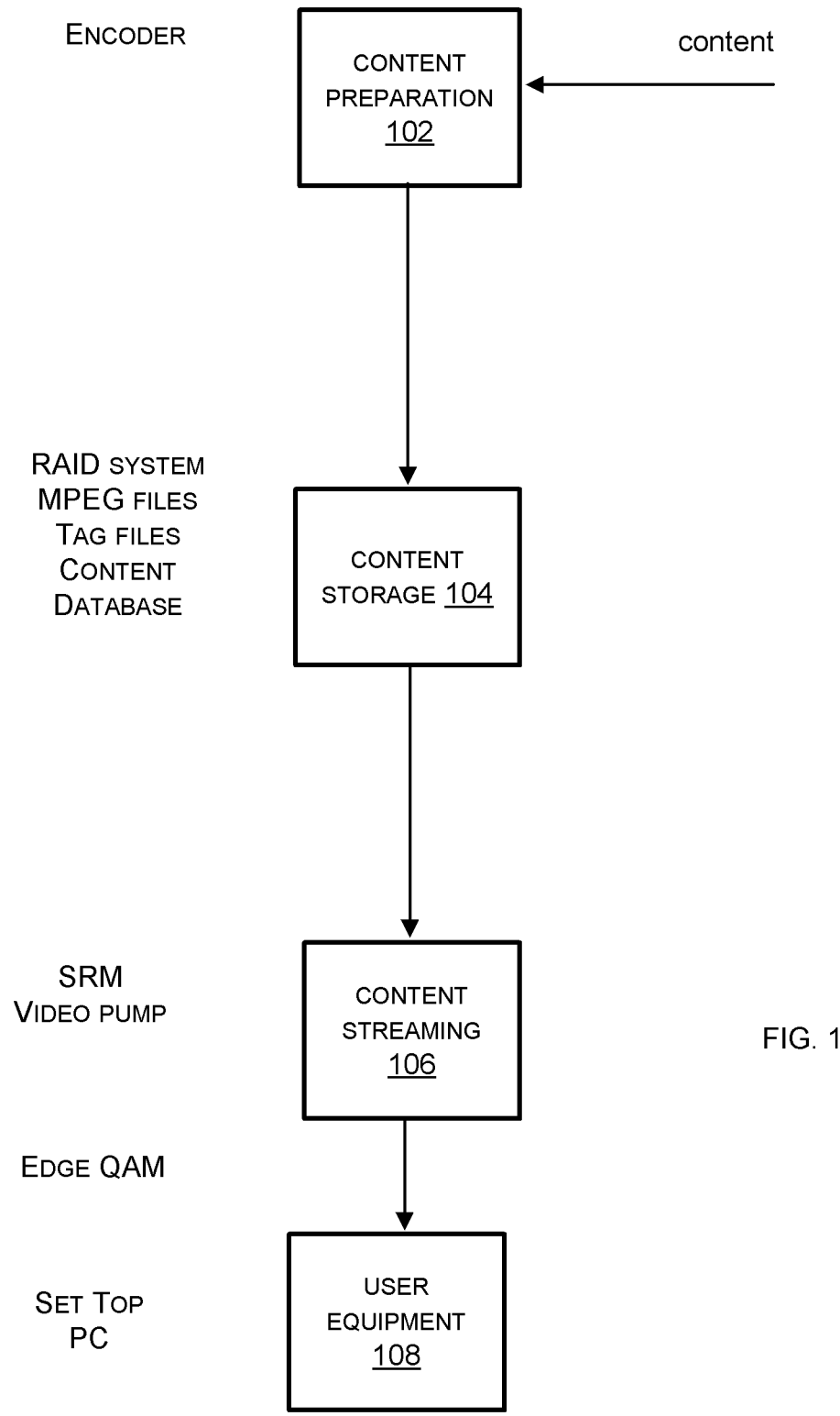
FIG. 1 is a block diagram illustration of an embodiment of a content validation environment.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information, embodied in device—readable media, memories, or circuits that may be applied to influence the operation of a device. Software, hardware, and firmware are examples of logic. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Overview

Motion Picture Experts Group (MPEG) formatted digital data may be carved up into 188 byte packets which carry some identifying marker. Some of these markers are "public" defined (in a public standard specification) such as for video and audio data. Others are added at the discretion of developers and are not publicly specified. These discretionary packets are referred to herein as "private packets".

Private packets may be used to store and transmit Globally Unique Identifiers (GUID) contained in the payload data of the private packets. This data can be subsequently used to validate the data. The GUIDS may be used to validate that the data on the disk is the same as that which was originally loaded ("content-based validation"), and to validate that the data in a streaming session is appropriate for that session ("session-based validation").

Content-based validation alone does not protect against certain types of corruption. The private packet approach may eliminate the risk window between when content is corrupted and when the checksum is validated. However, it does not protect against the wrong content being requested, two streams sent to the same set top, or corruption in network transmission.

Additionally, because stream delivery may make use of "logical content" that is composed of several physical files, including unrelated session-based files such as commercial advertisements, no single GUID based on the content may be sufficient.

A purely session-based approach does not address disk or volume based corruption, and thus does not prevent improper video from being seen under certain scenarios. These scenarios include: (1) disk data not being written (e.g. disks fail and report they wrote data when in fact they didn't); and (2) redundant array of inexpensive disks (RAID) reconstruction defects, where the correct data was not actually written to the disk.

Inserting content identifiers into the MPEG may thus be used to validate the data within the file. The content identifiers may be inserted at either regular intervals or irregular intervals with offset data encoded into the private packets and/or an external tag-file at content preparation or loading time. The streaming service (e.g. pump) may dynamically validate content data with a significant improvement to the performance of a system while offering improved functionality over a 'crawler'-type background process.

Session identifiers may also be inserted into the MPEG streams. Downstream gear such as set tops and edge QAMs may dynamically validate the session data and prevent access to inappropriate or unlicensed content. The packets comprising content identifiers may be reused to inject session identifiers. Using a session identifier instead of a content identifier allows for support of logical content comprising multiple physical content files, the definition of which may be constructed immediately prior to stream setup (e.g. to include commercial advertisements). Together this forms an end-to-end validation strategy that can detect many types of problems within a few milliseconds while requiring modest computing resources.

Content Validation

One strategy to provide content-based validation is to insert a unique content identifier into private packets within the MPEG file during content loading (encoding and storing the MPEG content file on the video server's mass storage). This helps ensure that the content requested from the video server is the correct data, e.g. that the data in the file is not corrupt, or that the file name is not pointing to the wrong file. Corruption can occur for several reasons, including various disk failures, defects in the volume or disk management layers, or human error where a file is accidentally renamed or copied over.

A unique identifier can be created in several ways. One embodiment combines a CableLabs™ provider id and asset id into a string or hash value. Another uses the filename, assuming it was specified using a unique algorithm, such as a combination of hostname and full file path. A third uses an $MD^5$ checksum of the original MPEG file. Others methods of creating a unique identifier may now be apparent to those of skill in the art.

This unique content identifier may be provided in the payload of the private packets. The insertion frequency of these packets may be specified when the content was loaded, or calculated based on disk access (block size, RAID layout, etc), or may be dependent on the content encoding (e.g. how many NULL packets exist), or some combination of these or other constraints. This unique content identifier may use all or part of the available payload space.

Content may be validated by extracting the data in the private packets and comparing it with an expected unique identifier stored elsewhere (e.g. in a tag file or an external database). A tag file is a file comprising offsets or pointers to frames of the content file. It may be comprised by a separate file or embodied as one or more sections of the content file it references. This technique may be used as an enhancement to a content crawler in addition to or in place of the checksum method. It may be applied dynamically as the content is being streamed or otherwise transmitted from the video or storage servers. When an incorrect identifier is encountered in the private packet, the server may terminate the transmission or simply opt to skip sending the data until a packet with the correct identifier is encountered again.

Session Validation

One strategy to provide session-based validation is to insert a unique session identifier into private packets within the MPEG stream during transmission from the video server. This helps ensure that the stream requested from the video server is the same one received by the set top. Corruption of the stream during transmission may occur when an edge QAM inserts the stream on the wrong channel, network switches corrupt or drop packets, or the RF network is incorrectly configured. Also, the set top may tune to the wrong channel and thus receive the wrong data.

A unique session identifier may be created in several ways. One embodiment uses an algorithm to create a globally unique Real-Time Session Protocol (RTSP) session identifier by combining the hostname, IP address, or primary MAC (Media Access Control) address with a long random number. Another uses a back-office service such as a Session Resource Manager (SRM) to provide a unique global session id in the RTSP SETUP request for the session. Others methods may now be apparent to those skilled in the art.

A unique session identifier may be provided in the payload of the private packets. The insertion frequency of these packets may be specified when the stream is requested, through configuration options, dependent on the content encoding (e.g. how many NULL packets exist), or some combination of these or other constraints. This unique session identifier may use all or part of the available payload space.

The unique session id may be communicated to the set top client during the session setup protocol. Other network gear such as edge QAMs may receive the identifier via an external back-office service such as an SRM.

Downstream gear such as edge QAMs or the set top client may compare the received id to data extracted from the private packets. This may occur dynamically as the content is being streamed by each component in the network chain. When a packet containing a different identifier is encountered, the device may terminate the transmission or simply opt to refuse to forward the stream until a packet with the correct identifier is encountered again.

Private Packet Insertion and Validation Efficiency

Private packet insertion comprises assigning an unused Packet Identifier (PID), adding it to the Program Map Table (PMT), inserting it into private packets of the MPEG transport stream, and nominally adjusting the Program Clock Reference (PCR) values. MPEG packets are generally 188 bytes with 184 bytes available for the data payload. The structure of this payload is determined by the packet type and PID. For private packets, the encoder may choose any format. For example, one could reserve a 32-byte string to store the identifier, followed by a 64-bit (8-byte) integer to store the offset of the next private packet, and leave the remaining 144 bytes for future extensions. As long as all components in the streaming network infrastructure that read the private packets are adapted to decode the data structure, many possible layout formats are possible.

Several methods for private packet insertion are described herein. One method inserts private packets at the desired locations without replacing any existing packets, i.e. adds extra packets to the MPEG file. This method benefits from being easy to implement and requires few computing resources. However, using the MPEG standard of 40 ppm (ppm=parts per million), a 3.75 Mbps stream may only allow injection of one packet per 10 seconds without introducing non-compliant PCR drift. Certain types of set tops and edge QAMs may not tolerate this drift. Simple packet addition also increases the bit-rate of the stream which may cause problems with channel bandwidth management.

One way to mitigate this problem is to re-stamp the PCR values to correct for the extra packets. This resolves the issue of MPEG-compliance. However, this may require significant computing resources to carry out. This also increases the MPEG stream's bit rate with similar negative impact on channel bandwidth.

Another way to mitigate the above problem is to remove NULL packets from the MPEG file for each private packet inserted. The PCR values between the private packet insertion location and the NULL packet removal location may or may not be adjusted, subject to the tradeoff noted above (1 packet per 10 seconds vs. non-compliant PCR jitter). This allows one to create a more MPEG-compliant stream at the same bit-rate. However, it requires significant computing resources, and depends on content encoding to provide sufficient NULL packets to provide the desired insertion frequency (and thus validation frequency).

One strategy to mitigate the computing resource problem would be to encode private packets (without the session id) during content preparation rather than during streaming, and to provide a manner to easily locate these packets without the need to parse the MPEG data. MPEG parsing is only done once (during content loading and preparation) instead of each time the content is streamed, significantly reducing computing resources. The byte offsets of these packets may be stored (e.g. in a tag file) or calculated in some manner. This would allow the video server to use "dead-reckoning" to locate the packets, either through a disk "seek" or computing offsets into memory buffers. This further reduces computing requirements. However, it does not allow for packet insertion at a frequency greater than that specified during the initial content preparation.

Two methods are herein described for providing dead-reckoning for private packets. One places them at regular intervals, such that the location is a multiple of some fixed value. This requires low computing resources, but may not be possible due to content encoding and other constraints placed on content preparation.

Another method to provide dead-reckoning is by inserting packets at irregular intervals, and providing a way to communicate that location to the streaming process. One way to communicate that location is through data in the private packet itself. If part of the payload is reserved for storing the byte offset of the next private packet, this data may be retrieved during content-based validation by the streaming process. This offset may then be used to locate the next private packet. However, finding the first packet may involve parsing the MPEG, which requires some computing resources.

Another way to communicate the private packet location is to store it in a file or database during content preparation (e.g. within a tag file). The streaming server may look up the next private packet location by accessing this information. However, this also requires some extra computing resources.

Some implementations may combine the two irregular offset mechanisms such that the first packet location is passed to the streaming process (pump), and the internal packet data is used until a new transition is encountered. Essentially what may happen on any pump command is that the offset of the first packet in that command segment is passed to the pump. The pump uses that offset to locate the data. Part of the data contains the offset to the next private packet. In essence all the offsets are stored twice, once in the tag file and once in the MPEG file, and whichever mechanism is superior for optimal performance is employed.

Dead-reckoning approaches allow for efficient content-based validation. To allow for efficient session-based validation, the content-based private packets may be re-used to inject the session identifiers. Because these packets are already inserted, no adjustments to the PCR, PMT, or bit-rate are required. And since the packets have already been located easily using dead-reckoning, low computing resources are involved to add the session identifier. The session identifier may either be added using available space in the payload, or may replace the content identifier if payload space is needed for other purposes.

The use of dead-reckoning may be limited to the video pump (streaming service) because it is primarily disk-based. Entities outside the video server (e.g. edge QAMs or set tops) need to locate private packets using MPEG parsing and inspection. However, these entities may already parse the MPEG while providing their own service, so this may not be a significant obstacle.

Content-based validation and session-based validation may operate at different frequencies. In some embodiments, two verification schemes overlap: one that checks the disk data in real-time, and one that supports the session validation done eventually by the downstream components. The disk insertion period is optimally controlled by RAID layout factors, while the outbound injection period (session validation) is optimally controlled by set top performance, human perception, etc. One implementation strategy is to compute a least common denominator of these desired frequencies and use that frequency during content preparation. Another is to use the smaller of the two.

Description of Exemplary Embodiments

FIG. 1 is a block diagram illustration of an embodiment of a content validation environment. During a content load request, content is provided to the content preparation component 102 along with an optional global unique content identifier. Component 102 encodes this identifier, or creates one if not supplied, into a proper MPEG packet, and then inserts these private packets into the content at the desired frequency, prior to or during storage of the content on the content storage component 104. Insertion of the private packets may be compensated for by eliminating NULL packets from the content file, or by simply adjusting PCR values to reflect the presence of the inserted private packets. The global unique content id may also be stored externally, such as within a content tag-file.

During an RTSP SETUP request, a logical content name and optionally a global unique session id may be provided. This logical content name may comprise several physical content files. For each physical content file, the video pump or other validation mechanism 106 may obtain the expected content id from the content, a tag file for the content, or other source, and then examine the stream for private packets at hard-coded (e.g. regular) offsets, or at irregular offsets that can vary in their offset from one another and from content to content. Packets at irregular offsets may be identified, for example, using a tag file, or using the content of a previous private packet. The verification mechanism 106 may verify that outgoing packets comprise the global unique content ID, indicating that there is no corruption or overwriting of the file.

For all physical content files (i.e. for the entire logical content stream), the pump or other validation mechanism 106 may replace the global unique content ID with a global unique session identifier, either the one supplied or one that is created for this session, which identifies the instance of the content that is being streamed. A downstream component such as an edge QAM, set top box or other user equipment (108), or HFC node, may examine the content that is streaming to it. In particular, the downstream component may inspect the private packets to confirm that the global unique session ID is consistent throughout the stream. This will indicate that corruption has not occurred between the content streaming component 106 and the downstream component.

Figure 2:
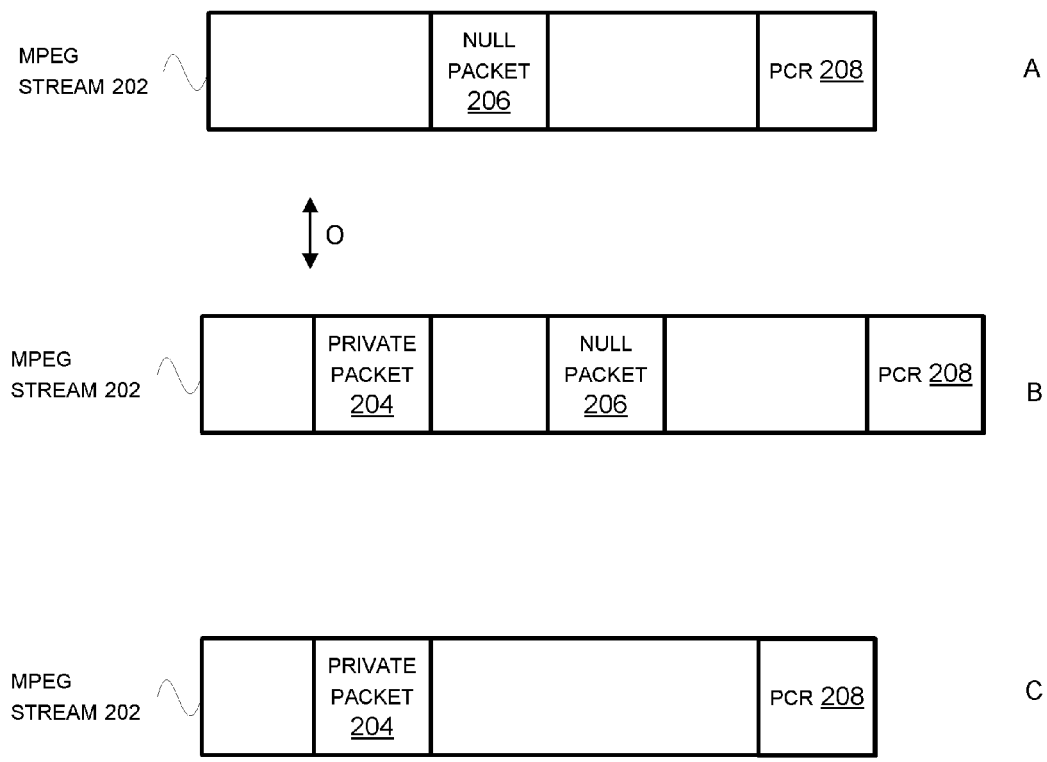
FIG. 2 is a block diagram illustration of an embodiment of private packet insertion in an MPEG stream.

FIG. 2 is a block diagram illustration of an embodiment of private packet insertion in an MPEG stream. Location A of FIG. 2 shows an embodiment of an MPEG 202 stream that may be received by the content preparation component 102. The stream 202 comprises numerous NULL packets 206 and PCR packets 208. At location O a private packet 204 may be inserted with a global unique content ID. At location B the stream is now longer than it was originally, and the timing of various downstream packets may be adjusted to compensate for the inserted private packet. One or more PCR values may need to be adjusted, and/or as shown in location C of FIG. 2, the NULL packet may be removed. This may result in the stream being of approximately the same length as it was before the private packet was inserted. Private packets may comprise a global unique content identifier upon being loaded onto the content storage component 104. This global unique content identifier in the private packet 204 may be replaced/supplemented by global unique session identifier as stream time by the streaming/validation component 106.

Figure 3:
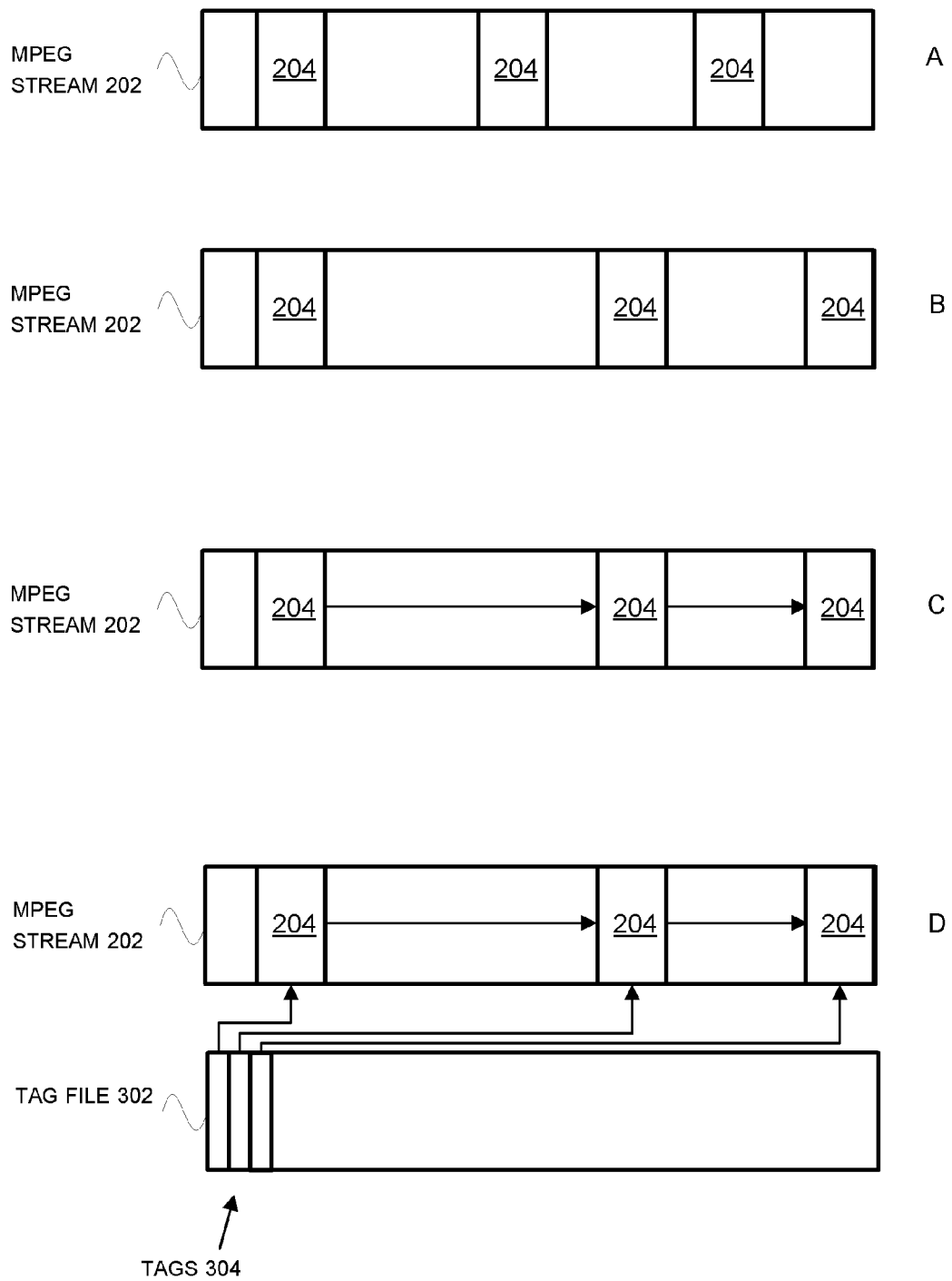
FIG. 3 is a block diagram illustration of an embodiment of private packet placement and location in an MPEG stream.

FIG. 3 is a block diagram illustration of an embodiment of private packet placement and location in an MPEG stream. At location A, an exemplary encoding is provided in which the private packets are placed at regular offsets within the MPEG stream 202. The regular offsets may be known values to various processes, such as the content streamer/validator 106 which may access those private packets 204 for purposes of content validation (e.g. checking the global content id) and insertion of a global unique session identifier. The hard-coded scheme has certain advantages and disadvantages as discussed previously in this disclosure. Location B shows a situation in which private packets 204 are coded at irregular offsets within an MPEG stream 202, again with certain advantages and disadvantages as discussed herein. Location C shows a situation in which the information about the irregular offsets at which private packets 204 are inserted is encoded into the private packets 204 themselves. Once the streaming function 106 or other functions know the offset of the first private packet 204, it is simple matter to read that packet and determine the offset of the next private packet from that packet, and so on through the stream, reducing the complexity of the processing involved in locating and accessing the private packets 204. At location D, the private packets 204 are again at irregular offsets within an MPEG stream 202. In some implementations the private packets may comprise an offset to the next private packet, or may also have their locations identified in a separate tag file 302 by tags, or a combination of both. The tag file 302 may be, for example, a trick play tag file with an extra section comprising tags 304 which identify locations of private packets 204 in the MPEG stream 202. A trick-play tag file comprises offsets of frames in the stream for purposes of enabling efficient playback speeds other than a normal viewing rate (e.g. 2× forward or reverse).

Figure 4:
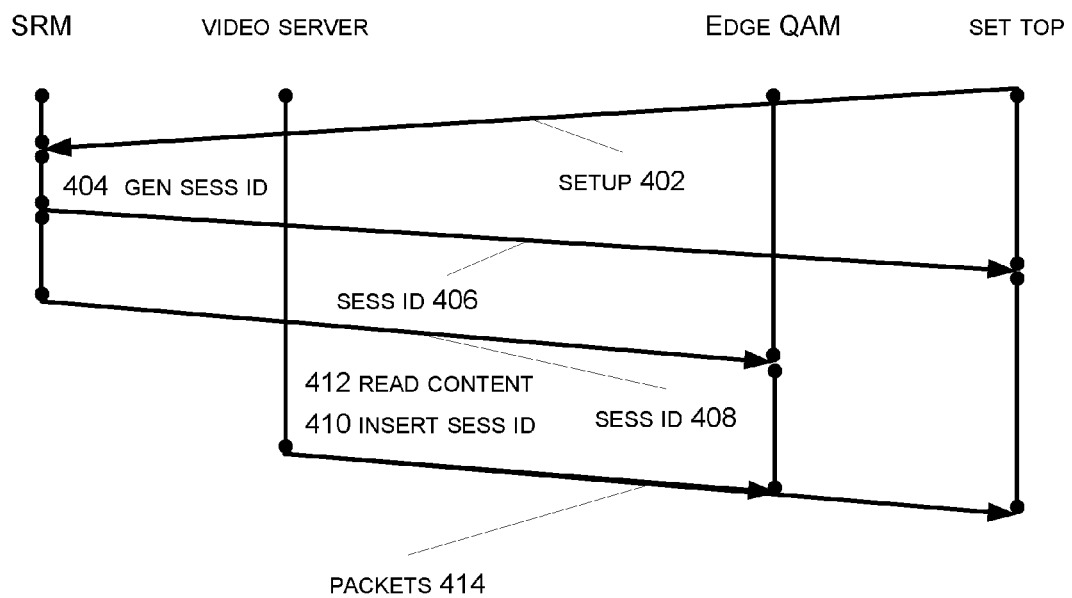
FIG. 4 is an action flow diagram of an embodiment of a session setup and stream verification process.

FIG. 4 is an action flow diagram of an embodiment of a session setup and stream verification process. At 402, a set-top box or other user equipment sends a session setup request to the session resource manager. The setup request could be a request, for example, for video on demand or other streaming content from the service provider. In other embodiments, the set top or other user equipment may communicate with the video server (RTSP server) directly to request a session, and the RTSP (Real Time Streaming Protocol) server may generate a unique session id and return it to the set top through RTSP protocol.

In response the session resource manager creates or causes to be created a session id (404). A session id should be globally unique within the domain of potential streams that the set-top box or edge QAM could receive from the system. At 406 and 408 the session id is communicated to the set-top and edge QAM, respectively. In some embodiments, the edge QAM and/or set-top may generate the session id themselves, using a common or reproducible algorithm. Once the session is established, the session id is communicated to various network components that receive, forward, or render (e.g. play, present) the stream. The content is read by the video server at 412, typically from a stored MPEG digital stream file. The session ids are inserted into packets of the digital stream (410). The packets are transmitted through various network components such as the edge QAM to the set-top box (414), each network component having been informed of or independently generating its own copy of the session id. Each network component may then check the stream packets to identify any corruption or mistakes in the digital stream.

Figure 5:
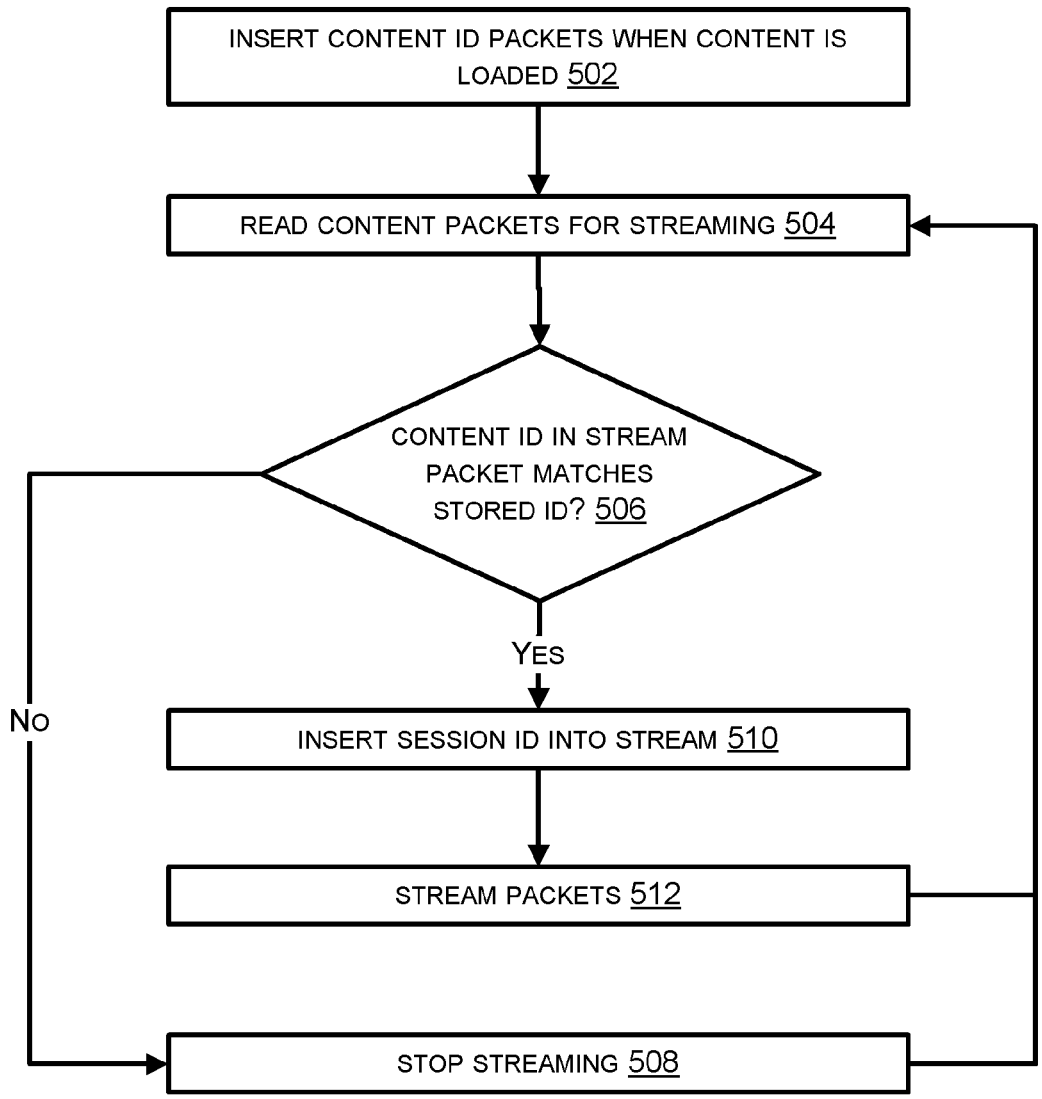
FIG. 5 is a flow chart of an embodiment of a content verification process.

FIG. 5 is a flow chart of an embodiment of a content verification process. At 502 content ids are inserted into packets of the digital content file when the file is loaded onto a video server or other storage medium from which may be access for streaming. At 504 content packets are read from the stored content file or files (e.g. for logical content) for streaming. A check is made if the content id in the stream packet matches the content ids stored, for example, in a content database or otherwise associated with the storage content (506). If so, the session identifier is inserted into the stream (510) and the packets are streamed (512). Otherwise, if the content id in the stream packets does not match the stored value for the content, streaming is paused or terminated (508) at least until packets having a correct content id are encountered in the future.

IMPLEMENTATIONS AND ALTERNATIVES

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A video server comprising:
non-transitory machine memories or circuits comprising logic to cause the video server to operate to insert unique content identifiers into private packets of a digital program stream file at a time of loading the digital program stream file onto the video server; and
logic to insert unique session identifiers into the private packets of a digital program stream created from the digital program stream file as the digital program stream is being communicated to a data network.

2. The video server of claim 1,
wherein the logic to insert the unique content identifiers into the private packets of the digital program stream file as a result of loading the digital program stream file onto the video server further comprises:
logic to set a frequency at which the unique content identifiers are inserted at which the at least partially according to one or more of a RAID block size for the digital program stream file or a RAID layout for the digital program stream file.

3. The video server of claim 1,
wherein the logic to insert the unique content identifiers into the private packets of the digital program stream file as a result of loading the digital program stream file onto the video server further comprises:
logic to determine a frequency at which the unique content identifiers are inserted at the time when the digital program stream file is loaded onto the video server.

4. The video server of claim 1,
wherein the logic to insert the unique content identifiers into the private packets of the digital program stream file as a result of loading the digital program stream file onto the video server further comprises:
logic to insert the private packets into the digital program stream file at a frequency less than one packet every 10 seconds.

5. The video server of claim 1,
wherein the logic to insert the unique content identifiers into the private packets of the digital program stream file as a result of loading the digital program stream file onto the video server further comprises:
logic to insert the private packets into the digital program stream file at a frequency greater than one packet every 10 seconds and to adjust PCR values of the digital program stream to account for the private packets.

6. The video server of claim 1,
wherein the logic to insert the unique content identifiers into the private packets of the digital program stream file as a result of loading the digital program stream file onto the video server further comprises:
logic to remove a NULL packet from the digital program stream for each of the private packets that is inserted.

7. The video server of claim 1,
wherein the logic to insert the unique content identifiers into the private packets of the digital program stream file as a result of loading the digital program stream file onto the video server further comprises:
logic to store references to locations of the private packets in a tag file separate from the digital program stream file.

8. The video server of claim 7,
wherein the logic to store the references to locations of the private packets in the tag file separate from the digital program stream file further comprises:

logic to store the references to locations of the private packets in a trick play tag file.

9. The video server of claim 1,
wherein the logic to insert the unique content identifiers into the private packets of the digital program stream file as a result of loading the digital program stream file onto the video server further comprises:
logic to store references to locations of the private packets in the private packets themselves.

10. The video server of claim 1,
further comprising:
logic to insert the unique content identifiers at regular intervals in the digital program stream file.

11. The video server of claim 1,
further comprising:
logic to insert the unique content identifiers at irregular intervals in the digital program stream file.

12. The video server of claim 1,
further comprising:
logic to verify a value of the unique content identifiers in the private packets as the private packets are read for streaming.

13. The video server of claim 12,
wherein the logic to verify the value of the unique content identifiers in the private packets as the private packets are read for streaming further comprises:
logic to suspend transmitting the digital program stream when an invalid content identifier is encountered.

14. The video server of claim 12,
wherein the logic to verify the value of the unique content identifiers in the private packets as the private packets are read for streaming further comprises:
logic to apply, during streaming of the digital program stream, both of references to locations of the private packets in the private packets themselves, and the references to locations of the private packets in a separate tag file.

15. The video server of claim 1,
wherein the logic to insert the unique session identifiers into the private packets of the digital program stream as the digital program stream is being communicated to the data network further comprises:
logic to insert the unique session identifiers into the private packets of the digital program stream comprising the unique content identifiers for the stream.

16. The video server of claim 1,
further comprising:
logic to insert the unique session identifiers at regular intervals in the digital program stream file.

17. The video server of claim 1,
further comprising:
logic to insert the unique session identifiers at irregular intervals in the digital program stream file.

18. The video server of claim 1,
further comprising:
logic to set a frequency at which unique content identifiers are inserted at which at least partially according to one or more of a number of NULL packets in the content stream or a frequency of the NULL packets in the content stream.

19. The video server of claim 1,
further comprising:
logic to insert the private packets into the digital program stream file at a rate that is a least common denominator of a desired insertion frequency for the unique content identifiers and a desired frequency for the unique session identifiers.

20. The video server of claim 1,
further comprising:
logic to insert the private packets into the digital program stream file at a rate that is a smaller of a desired insertion frequency for the unique content identifiers and a desired frequency for the unique session identifiers.

21. The video server of claim 1,
further comprising:
logic to crawl content stored by the video server, generating checksums.

* * * * *